C. J. DUSSEAU.
DISH WASHER.
APPLICATION FILED MAR. 27, 1914.
1,123,260.
Patented Jan. 5, 1915.
2 SHEETS—SHEET 2.
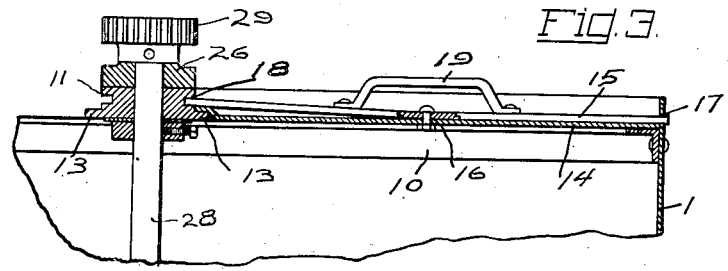
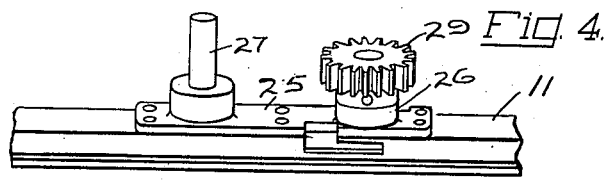
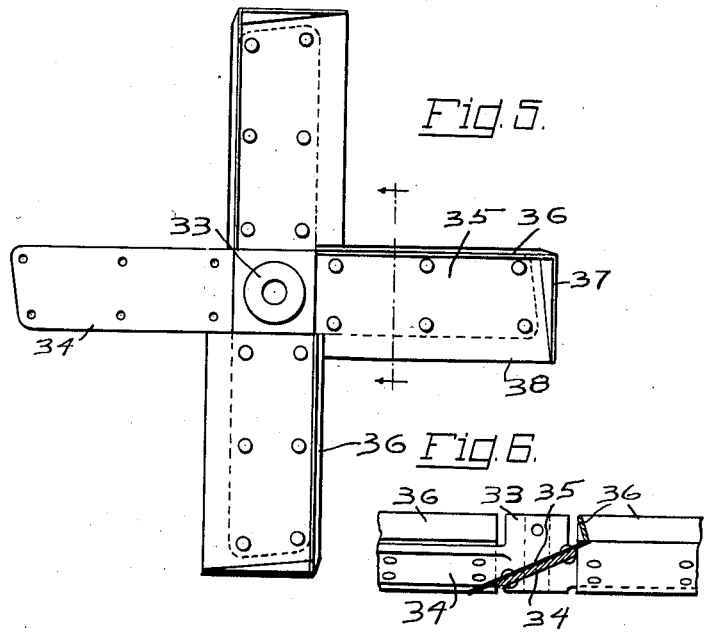
WITNESSES:—
INVENTOR.

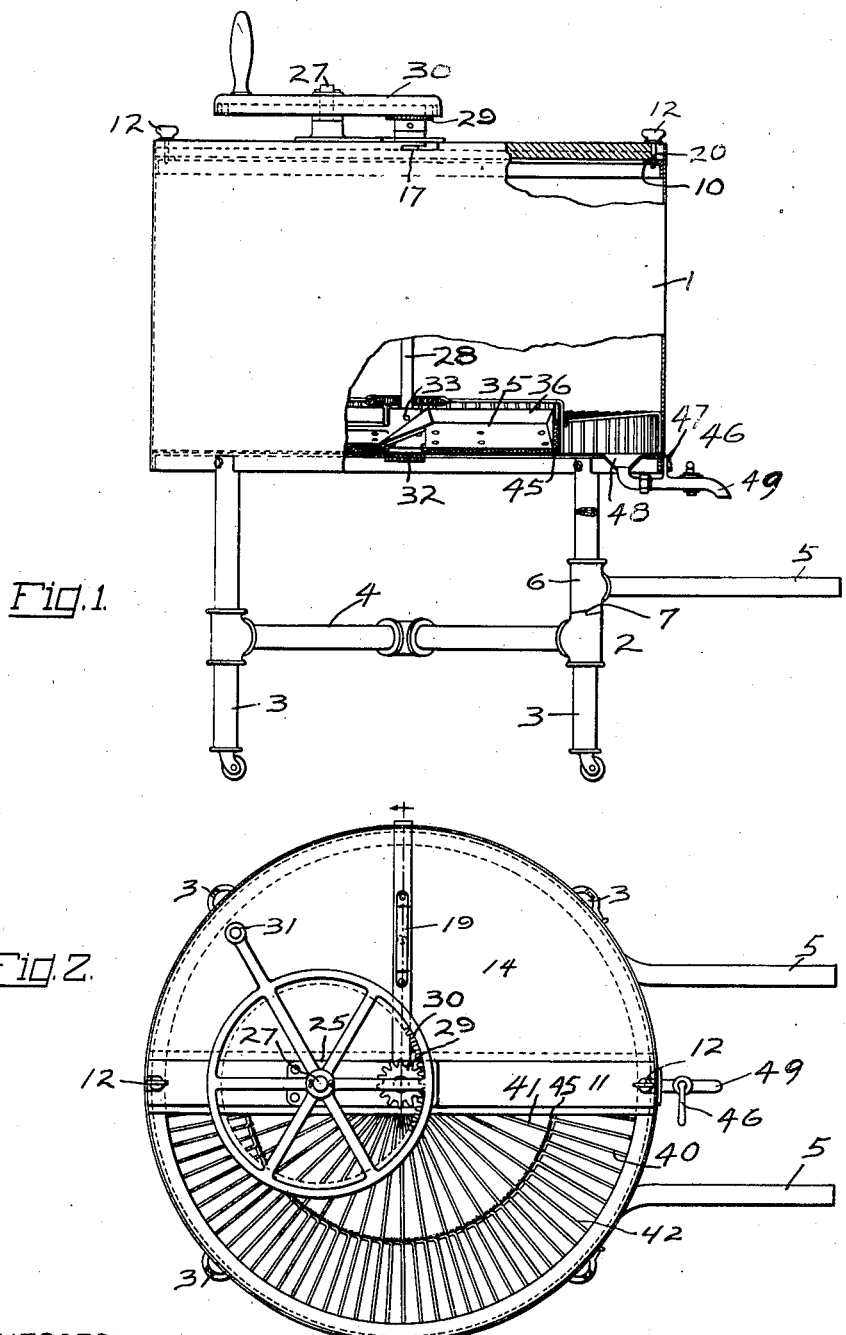

UNITED STATES PATENT OFFICE.

CORNELIUS J. DUSSEAU, OF TOLEDO, OHIO.

DISH-WASHER.

1,123,260.   Specification of Letters Patent.   Patented Jan. 5, 1915.

Application filed March 27, 1914. Serial No. 827,540.

*To all whom it may concern:*

Be it known that I, CORNELIUS J. DUSSEAU, a citizen of the United States, and a resident of Toledo, in the county of Lucas and State of Ohio, have invented a certain new and useful Dish-Washer; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to dish washers.

My invention has for its object to produce a dish washing machine that may be cheaply made, its parts easily assembled and yet the machine produced will be efficient and durable and one wherein the mechanism may be easily removed for purposes of cleaning and easily replaced.

By my invention, comparatively very little water is required to perform the operation of washing dishes.

The invention may be contained in many forms of constructions all of which come within the purview of my claims hereinafter appended. To show the practicability of my invention, I have selected one of such constructions as an example and shall describe it hereinafter. The construction selected is illustrated in the accompanying drawings.

Figure 1 of the drawing, illustrates a side view partly in section of my invention. Fig. 2 illustrates a top view of the construction shown in Fig. 1 with a part of the cover removed. Fig. 3 illustrates a sectional view showing the manner in which the parts of the cover may be locked. Fig. 4 illustrates a part of the mechanism for operating the machine. Fig. 5 illustrates the vanes used for dashing the water upon the dishes. Fig. 6 is a sectional view of one of the vanes shown in Fig. 5.

1, Fig. 1, is a container or receptacle for containing the dishes and also the washing apparatus.

2 is a standard for supporting the receptacle 1. The standard 2 has legs 3 which are connected and braced together by means of the diagonal parts 4. One side of the standard is provided with arms 5 which are connected to sleeves 6 which have limit stops 7. The arms 5 are curved near the supporting end so as to bring them nearer together and in parallel relation to each other. The arms 5 may be turned on one of the legs 3 so as to extend beneath the receptacle 1. They may be turned so as to extend outwardly by rotation of the sleeves 6 on the legs 3. They form a means of support for a pan or pail or shelf or other suitable device or article.

The container 1 is provided with an inturned flange or circular angle iron 10 located on the inside and near the upper edge of the container 1. A cross bar 11 is located on the top of the angle iron 10 and extends diametrically across the top of the container. It is secured in position by means of the wing nuts and bolts 12 which are located in slots 20 formed in the ends of the bar 11. The bar 11, together with the parts connecting thereto, may be removed by unscrewing the wing nuts and slipping them laterally in the slot until one end of the bar 11 is disengaged, whereupon the bar may be lifted together with the parts connected thereto, from the machine. The bar 11 is rabbeted along the edges 13. Semicircular sheet iron covers 14 are placed on the rabbeted edges of the bar 11 and the circular angle iron 10. They are each provided with a latch bar 15 which is pivoted to the cover by the bolt 16. The ends of the latch bar extend within inclined slots 17 and 18 located in the upper edge of the receptacle 1 and in the diagonal bar 11. When the latch 15 is rotated in one direction, its ends penetrate the slots 17 and 18 which operate to press the edge of the semicylindrical cover down upon the rabbeted edge of the bar 11 and the circular angle iron 10. The handle 19 is connected to the latch bar 15 and is used for turning the latch bar 15 and also for lifting the semicylindrical cover when it is unlatched from the container. The diagonal bar 11 supports a casting 25 having an inside bearing 26 and a bearing pin 27. A shaft 28 extends through the bearing 26. A pinion 29 is keyed to the shaft 28. An inside cog wheel 30 is placed upon the bearing pin 7. It meshes with the pinion 29 and when rotated, rotates the pinion at high speed. The cog wheel 30 is provided with a handle 31 whereby it may be manually operated. The shaft 28 is stepped into a disk 32. A casting 33 is keyed to the lower end of the shaft 28. The casting is provided with arms 34 to which are riveted vanes or scoops 35. The vanes or scoops 35 have angular extending flanges 36 along their upper edges, and upwardly extending flanges 37 extending across the ends of the vanes 35. The flanges 37 roll gradually down to the plane of the body of the vane. The upper edges of the flanges 37, moreover, are inclined to the plane of the vanes so that the acute angle of the triangle shaped flange 37 is located at the leading edge 38 of the vanes. By this construction, when the vanes are rotated, they will scoop up water placed in the bottom of the container 1 and will throw it up and outward by centrifugal force and by the action of the flanges 36 and 37. There will, therefore, be very little water which will be pushed to one side by the operation of the scoops or vanes. They will collect practically all of the water and throw it upward and outward from the center of the bottom of the container.

A wire rack 40 is located on the bottom of the container 1. It extends from around the shaft 28 to the outer wall of the container. It is so made as to form a part 41 located above the paddles. This prevents the paddles from striking the dishes placed in the container 1. The wire rack 40 is also provided with an annular part 42, which slopes inwardly and is located a little below the level of the inner portion 41 of the rack 40. The dishes are placed preferably on the annular portion 42. As the paddles are rotated, they scoop up the water and dash it upon the dishes located upon the annular portion 42 of the rack. Articles may also be placed upon the central portion 41 of the rack which will also receive some of the water carried upward by the paddles of the machine. In order to prevent the paddles or vanes from collecting the material washed from the plates in the operation of the machine, a screen 45 is located around the outside of the central portion of the rack 41 and extends to the height of the inner edge of the annular portion 42 of the rack. This screen prevents the water which is swished out by the operation of the paddles onto the dishes from carrying into the central portion of the bottom of the container the material that is washed from the dishes. This material will collect beneath the annular portion 42 of the rack and on the outside of the screen so that paddles will swish upward only the water which sieves or passes through the screen 45 and consequently will cause only the clean water or water free from foreign matter, to swish up onto the dishes.

The receptacle is provided with a faucet 49 having a cock 46 which is secured by an ear and bolt 47 to the receptacle 1. It communicates with a depressed portion 48 in the bottom of the receptacle 1. The faucet forms an outlet for the water placed in the receptacle. It communicates with the portion of the bottom of the receptacle located on the outside of the sieve 45 so that the dirty water, that is, the water containing the material washed from the plates, is, to a great extent, first drawn from the receptacle.

Suitable supporting racks for smaller articles may be supported around the wall of the dish washer in order to receive a portion of the water that is dashed upward by the operation of the plates.

What I claim as new and desire to secure by Letters Patent, is as follows:

1. The combination of a receptacle, an annular rack for supporting articles above the bottom of the receptacle, a plurality of flanged vanes located centrally within the annular rack for scooping water from the bottom of the receptacle onto the articles, and a sieve surrounding the inner side of the rack and extending to the bottom of the receptacle.

2. The combination of a receptacle, a rack covering the bottom of the receptacle for supporting articles above the bottom of the receptacle, a plurality of flanged vanes located centrally in the rack for scooping water from the bottom of the receptacle onto the articles placed on the rack, and a cylindrical sieve located concentrically with the receptacle and near the ends of the said vanes.

3. The combination of a receptacle, means for supporting articles above the bottom of the receptacle, a plurality of flanged vanes for scooping the water from the bottom of the receptacle onto the articles, and means preventing material washed from the articles from being scooped by the vanes.

4. The combination of a receptacle, means for supporting articles above the bottom of the receptacle, flanged vanes for scooping water onto the articles, and a sieve for preventing the material washed from the articles from being directed onto the articles.

5. The combination of a receptacle, a rack for supporting articles above the bottom of the receptacles, vanes for scooping water onto the articles, means for rotating the vanes, a diametrically disposed bar for supporting the said means, for releasably locking the ends of the said bar to the receptacle for the removal of the said parts from the receptacle, and latching rods extending radially across the covers from the bar to the outer wall of the receptacle for locking the covers to the bar and the wall of the receptacle.

6. The combination of a receptacle, a rack for supporting articles above the bottom of the receptacle, vanes for scooping water onto the articles, means for rotating the vanes, a diametrically disposed bar for supporting the said means, means for releasably locking the ends of the said bar to the receptacle for the removal of the said parts from the receptacle, latching rods extending radially across the covers from the bar to the outer wall of the receptacle for locking the covers to the bar and the wall of the receptacle, and handles located on the latch rods for rotating the said latch rods, the wall of the receptacle and the bar having slots in which the ends of the rods engage.

In testimony whereof, I have hereunto signed my name to this specification in the presence of two subscribing witnesses.

CORNELIUS J. DUSSEAU.

Witnesses:
F. E. AUL,
S. T. KLOTZ.